May 17, 1960 M. C. SUPITILOV 2,937,028

PLASTIC BELT FOR SOUND RECORDING AND REPRODUCING

Filed June 17, 1954

INVENTOR.
Michael C. Supitilov
BY.
Robert L. Kahn
Atty.

United States Patent Office 2,937,028

Patented May 17, 1960

2,937,028

PLASTIC BELT FOR SOUND RECORDING AND REPRODUCING

Michael C. Supitilov, St. Charles, Ill., assignor to Du Kane Corporation, St. Charles, Ill., a corporation of Illinois Application June 17, 1954, Serial No. 437,541

2 Claims. (Cl. 274—41.4)

This invention relates to a plastic belt for sound recording and sound reproducing, and particularly for use in magnetic sound recording and reproduction.

In magnetic recording systems, it is possible to use a seamless flexible belt of suitable plastic material. This belt may have suitable grooves embossed thereon in connection with tracking. This grooved belt itself may contain the recorded material on one, other or both sides, or the magnetic recording surface may be on a seamless belt, separate and distinct from the grooved belt surface.

Thus as an example, a plastic belt having suitable grooves embossed thereon may be used as a track for guiding a recording or reproducing head. Such recording or reproducing head may cooperate with a suitable part or parts of the grooved surface or with the reverse face of the grooved belt or may cooperate with a physically separate smooth belt of the same material as the grooved belt.

Due to the substantial (as far as tracking is concerned) change in dimensions of all plastics with temperature, humidity or both, the use of a pre-grooved plastic belt for controlling tracking is highly desirable. With conventional tracking procedure, errors resulting from such dimensional changes are cumulative. Even if a physically separate tracking belt is used, it is desirable that the record belt be of the same material as the tracking belt so that both may change equally with temperature and humidity. For more precise tracking, the same plastic belt will carry both the tracking grooves and the sound track.

Since a material for magnetic recording and reproduction does not change its appearance with use, the term "sound track" will be used to define the physical paths along which recording or reproduction is to be effected, and the term "guide track" will be used to define the physical groove for determining or following a sound track.

Where a record belt is used, mechanical requirements for simplicity and space suggest the use of spaced mandrels over which a belt is disposed and between which the belt is tensioned. This results in continual flexure of the belt during use. A belt may be flattened for storage. It is therefore essential that a plastic belt be flexible and resilient. By resilient is meant a "live" or springy material having good recovery without sacrificing flexibility. An example of "live" material is the rubber in an automobile inner tube. The "liveness" is not necessarily the stretch of such rubber as such stretch is generally not desired in the belt. In order to provide magnetic recording and reproduction on such a belt, a suitable magnetic coating must be applied thereto. It is essential that a plastic belt take such coating and retain the same in spite of flexing. A record belt of this character must have generally uniform flexibility and resilience over a substantial temperature range, such temperature range extending both below and above what may be considered as possible room temperatures. To avoid permanent damage to a record, it is also essential that the record belt be resistant to creasing and to tearing. Cold flow is undesirable for the reason that pre-formed guide tracks must remain intact.

In addition, a record belt should have good shelf life and should have good fatigue properties for withstanding repeated bendings, foldings and flexings. The belt should have desirable chemical stability so that it neither affects nor is affected by contact with the user or many things such as furniture, fabric, etc. present in daily life. The belt should be non-inflammable and should be dense and susceptible to taking and keeping a glossy smooth finish.

A plastic belt which is carried by spaced mandrels, particularly mandrels having hard belt engaging surfaces, should also have vibration dissipation properties. This is desirable to provide isolation from vibration between the transducer head and one or both mandrels. Vibrations are frequently generated by the "angle of attack" of the transducer laminations on the record medium. In such cases, the hard magnetizable coating causes the laminations to chatter or sing, this being due to alternate grabbing and slipping of the lamination and surface. This difficulty is frequently met by using felt pads and springs under the record as well as by introducing a lubricant in the coating, of which more will be stated later.

In accordance with this invention, I provide a belt which is readily susceptible to embossing permanent tracking grooves thereon and which meets all the above requirements to a remarkable degree. In addition, the new record belt has properties which are definitely superior to other record materials in connection with the application of magnetizable coatings and properties of such coatings. In that respect, the properties of the material used in making the belt makes it advantageous to use the material for record purposes generally, whether the record be in the form of a belt, tape, flexible disc or the like. These added properties will be described later.

I have found that flexible nylons have unusual properties and characteristics which are highly desirable in the manufacture and use of magnetizable record media, particularly belts. I have also found that nylons generally, whether flexible or not, have unusual properties and characteristics for the manufacture and use of magnetizable record coatings on base materials generally and on flexible nylon base materials specifically. For coating use, nylons generally may be used due to the thinness of the coatings. For the record base material, where the material is to have the various characteristics discussed above, flexible nylons having suitable hardness and stiffness endow the record with remarkable, and what might superficially appear to be inconsistent, characteristics.

As is well known, nylons may be made to be rigid or flexible. See for example a booklet entitled "Du Pont Nylon Molding Powder" published by E. I. du Pont de Nemours & Co. (Inc.) of Wilmington, Delaware, copyrighted in 1952. There is available a flexible nylon, known in the trade as du Pont type 8, or sold by this manufacturer under its code designation FM-8001. The type 8 nylon of du Pont, as measured under the A.S.T.M. standards, has a hardness of about R35 (Rockwell) and a stiffness at about 73° F. of about 14,000 lbs. per square inch. While the type 8 characteristics are not listed on page 12 of the above identified booklet, other nylons are. The figures given above are average values and will vary as set forth in the booklet. The FM-8001 nylon makes a highly satisfactory record base material.

While not as desirable for base material as type 8 nylon, the nylon available under the designation FM-6901 is also excellent as a record material. Its average hardness and stiffness figures are about R45 Rockwell and about 20,000 lbs./sq. in. respectively. A large variety of nylons may be made by simply mixing various kinds of nylon powders, as for example mixing the 6901 and 8001 kinds.

A person skilled in nylon technique can readily obtain various kinds of flexible nylon. In general, for belt record base material embodying the present invention, satisfactory results may be obtained by using a flexible nylon having an average hardness range from about R30 to about R50 (Rockwell) and an average stiffness range from about 10,000 to about 25,000 lbs./sq. in., these being determined under the testing conditions set forth on page 12 of the booklet; i.e. the stiffness being at about 73° F. and all tests made in accordance with the methods and standards of A.S.T.M. The preferred range of averages is from about R35 to about R45 for hardness and from about 14,000 to about 20,000 pounds/sq. in. for stiffness.

For coating purposes, the nylon is preferably of the flexible variety and may conveniently be the same as used for base material. However, the coating nylon may include other less flexible forms of nylon or any kind of nylon since the thinness of the coating will be substantially less than the thinness of the record material, particularly when the record material is in the form of a belt or disc. The necessity of obtaining an adherent coating will, in the case of plastic base materials, including nylons, involve the use of a solvent which will be common to the coating nylon and base material. Certain base materials, as glass for example, will take and retain nylon coatings obtained by dissolving nylon in a solvent.

Since there are so many solvents available for nylons and plastics generally, it is possible to obtain an adherent coating of nylon on substantially all plastics, including nylons, which may be dissolved on many materials as glass, metal, etc. As is well known, some solvents will dissolve certain nylons and not other nylons.

At present, the fluorinated polyethylene plastics, available in the trade as Teflon and Kel-F respectively, will not take an adherent coating of nylon or any other plastic, for that matter. In general, however, those skilled in plastics can readily provide a nylon solution which will adhere to base materials of nylon, plastics generally (excepting the two mentioned above) and many desirable base materials as glass, metal, wood, etc. It will therefore be understood that by the terms "compatible nylon solvent," "solvent for producing an adherent nylon coating" and similar expressions is meant that a solvent is selected which will in fact produce an adherent nylon coating.

In regard to adherence, nylon is highly desirable as a coating for magnetizable records. Conventional binders, as cellulose acetate for example, cannot be made to adhere to many base materials. This undesirable property is aggravated by the requirement of some lubricant material in the coating, since the iron oxide coating used is an abrasive. Castor oil or molybdenum disulphide are frequently used to impart lubrication properties to the coating to minimize wear on the transducer head, but these materials, particularly the castor oil, are undesirable otherwise because of coating and adherence considerations. Nylon as a binder and as a coating for a magnetizable record, generally irrespective of the nature of the record base material, is self-lubricating and has such an affinity for iron oxide particles as to make it possible to coat such particles with an unusually fine film of nylon. The superior strength of nylon makes for a tough film.

Because of the superior strength of nylon, its great affinity for magnetizable iron oxide particles, its toughness and its great adhering powers, a nylon binder makes it practical to have a greater density of iron oxide. This makes for a magnetizable record having a decidedly greater sensitivity and output.

Nylon has an additional advantage over other binders in that it is readily calendered to provide a glossy surface having maximum surface smoothness and minimum amount of binder material. This also results in greater record sensitivity and output since the separation between transducer iron and oxide particles is reduced.

In addition to the above properties of the plastic, nylon has a sufficiently wide range of softening temperature so that the nylon may be worked for embossing or may be welded and embossed. Below the temperature range where nylon melts or softens substantially, nylon has the desirable property of maintaining its flexibility and resilience to a far greater degree over extended temperature ranges than is true of most non-rigid plastics.

For a more thorough understanding of the invention, reference will now be made to the drawings wherein Figure 1 shows a record belt embodying the present invention.

Record belt 10 has edges 11 and 12 and is of flexible nylon. Belt 10 may have any desired dimensions and in practice may have a width of the order of about 4" and a circumferential length of the order of about 12". These dimensions are exemplary and will vary with the type of recording and reproducing machine used and purposes for which the belt is to be used. The belt material itself is from sheet nylon having a thickness of between about .012" and about .025", preferably about .017". The flexible nylon may be of the types previously referred to, i.e. numbers FM-8001 or FM-6901 or a mixture of these or other nylons having the desired flexibility, hardness and stiffness in the range as previously given.

Belt 10 has embossed thereon guide track generally indicated by 15. Guide track 15 may be helical and extend for substantially the entire width of the belt. It is also possible to have a number of parallel endless guide tracks or a number of separate helical tracks disposed in relation to each other in the same manner as a double or triple screw thread. It is also possible to have guide track 15 extend for only a portion of the width of the belt.

Figure 1:
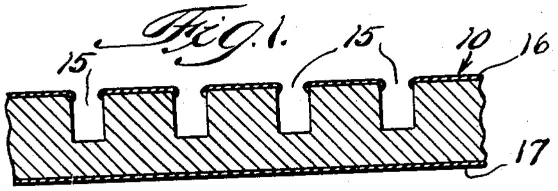

Guide track 15 is sufficietly deep and wide so that mechanical tracking is possible. As an example, guide track 15 may have a depth of the order of about .009". As illustrated in Figure 1, the sides of the track extend generally perpendicularly to the plane of the sheet material. This may be changed to suit requirements. The pitch of track 15 may be selected to suit requirements. For practical magnetic recording and reproduction, a sound track should have a transverse width at the record surface at least of the order of about .015". Smaller widths are possible but impose severe demands upon amplifiers and transducers. By having a guide track width at the record surface of about .006" and having a pitch of about .021" (48 threads per inch), it will provide a sound track width of about .015". If the lands between adjacent grooves are used as a sound track, then the sound track width will be equal to the spacing between groove walls. On the other hand, if the guide track is used purely for guiding purposes and another part of the record surface is used for sound track, then the maximum possible width of the sound track will be equal to the pitch. The various dimensions are measured in the plane defined by the lands.

Suitable blank portions along edges 11 and 12 of the belt may be left. The belt may be embossed by the method and apparatus disclosed in the co-pending application of Michael C. Supitilov, Clifford E. Johnson and Oliver W. Norton, Serial No. 429,842, filed May 14, 1954.

As has been previously pointed out, an embossed belt may be used purely for guiding purposes in connection with a separate record belt of similar material having a suitable magnetizable record surface. For many purposes, it will be desirable to have the grooved side of belt 10 coated as at 16 or the reverse ungrooved side of the belt coated as at 17, or both. In any event, whether the belt surface to be coated with magnetic oxide is smooth or embossed, the same coating technique may be used.

In order to apply a magnetic coating to a record material, a suspension of magnetic oxide or oxides in dissolved nylon is prepared. The iron oxide or oxides may be either of the red or black variety or a mixture as customarily used in magnetic recording. In accordance with customary practice, finely divided magnetic iron oxide or oxides having a particle size no larger than about one micron are used.

The solution of nylon and dry magnetic oxide or oxides is ball milled until tests show the milling to be sufficient. This is in accord with current practice. In practice, the nylon solution may be disposed in the ball mill and the dry oxide powder poured in. The order is unimportant and it is possible to mix the powder and solution before introducing the same into the ball mill. The action of the ball mill tends to reduce agglomeration of oxides and to coat individual oxide particles with a coating of nylon solution. The proportion by weight of iron oxide to nylon plus iron oxide can range from about 70% of iron oxide up to a maximum of about 90% of iron oxide. A preferred maximum is about 85%. The proportion is by weight of the resulting iron oxide-nylon mixture, after the binder is dry. The top proportions of iron oxide herein given are higher than are commercially practical with other binders. The amount of solvent and diluent may vary, depending upon coating conditions. In general, the oxide suspension in nylon solution will be a heavy mud resembling a water and plaster-of-Paris mix in consistency.

As is well understood, the greater the iron oxide content of the coating, the greater is the effective permeability of the coating. Everything else being the same, the new coating resulting from the mixture of dissolved nylon and iron oxide can be made to have a substantially higher permeability than prior coatings, while retaining good film strength along with suitable flexibility and adherence.

The nature of the nylon solvent (or mixture making up a solvent) will depend on such factors as nature of the belt material, desired speed of drying and cost. Composite solvents containing retarders to control drying time are well known.

As has been previously pointed out, the nylon solvent must in general "bite" into the belt material to provide an adherent film. Where the nylon solvent also dissolves the base material, the belt in this instance, there is generally no question of adherence. In the case of glass, wood, metal and other materials, the adherence of the film has little to do with solvent action on the base material. But for plastics generally, the adherence of the coating is due generally to a true welding action incident to a common solvent acting on the coating binder and base material. In the case of nylons, some liquids are solvents for certain nylons only. However, there are solvents which will handle all types of nylons. Examples of such solvents are molten phenol and hot formic acid (pages 16 and 47 of "Du Pont Nylon Molding Powder"). Other solvents are also known. The flexible nylons, particularly type 8, are dissolved by methyl, ethyl, butyl, furfuryl, propyl and iso-propyl alcohols, or mixtures of the same, as one exemplary group. As a rule, some water with the solvent may be used to control solubility of the nylon. The amount of water may run as high as 20 or 30% of the solvent volume, although less water may be desirable under certain conditions where the coating is not to be used immediately. Nylon coatings are used for textiles and paper and solutions for such coatings are described in Information Bulletin No. X-21 published by E. I. du Pont de Nemours & Co. (Inc.) and referred to on page 47 of the Nylon Molding Powder booklet previously identified.

Various mixtures of the previously mentioned solvents may be made to provide a composite nylon solvent having desired drying speed. For example, methyl alcohol will tend to speed up drying of the coating while furfuryl alcohol will tend to lengthen the drying time.

Following is one example of a coating composition:

| | Parts by weight |
|---|---|
| Iron oxide (IRN-110) | 126 |
| Pellets of FM-8001 nylon | 14 |
| Methyl alcohol (substantially pure) | 95 |
| Butyl alcohol (substantially pure) | 100 |
| Water | 30 |
| Methyl Cellosolve acetate | 35 |
| Total (all by weight) | 400 |

The iron oxide number is the code designation of a particular grade of gamma red magnetic iron oxide sold by C. K. Williams & Co. of East St. Louis, Illinois, for use in magnetic record coating and other purposes.

The last four items make up a nylon solvent. This solution and iron oxide is ball milled under conditions to prevent loss of solvent.

The above example yields about 90% of iron oxide and is a rapid drying coating. The iron oxide in this example may be reduced from the figure given to provide a lower proportion of iron oxide to iron-oxide-plus-solvent. In general, a proportion of about 85% of iron oxide to iron-oxide-plus-solvent will result in a coating having good characteristics for adherence and prevention of cracks. In calculating the above proportions, it will be found that a small amount of water and methyl Cellosolve acetate remains permanently in the binder. For that reason, the proportion of iron oxide to iron-oxide-plus-nylon really includes a small amount of a portion of the solvents. This addition in the proportion due to the solvents is small. The proportions of alcohol and Cellosolve acetate may be varied to control drying time. The same is true of the water which can also be varied.

The following is a second example of a coating composition utilizing the present invention:

| | Parts by weight | |
|---|---|---|
| Iron oxide (IRN-110) | 119 | |
| FM-8001 Nylon | 21 | |
| $CH_3OH$ | 75 | Solvents |
| BuOH | 100 | Solvents |
| Isopropyl alcohol | 20 | Solvents |
| Methyl Cellosolve acetate | 35 | Solvents |
| Water | 30 | Solvents |
| Total | 400 | |

The above example yields about 85% iron oxide to iron-oxide-plus-binder. Due to the reduced quantity of methyl alcohol in the second example, as well as the addition of higher alcohols, the drying time in this example is longer than in the first example.

The iron oxide content may, of course, be reduced as above. The methyl Cellosolve acetate and butyl alcohol as examples can be replaced. If slower drying is required, furfuryl alcohol can be used as a control. The greater the quantity of this alcohol, the slower the drying time.

In both examples other nylons, such as the FM-6901 or mixtures of nylons, may be used and appropriate solvent mixtures made. The strength of the film and its ability to withstand cracking will in some measure be determined by the thickness of the film and the nature of the base material. In addition, the amount of creasing to be withstood by the coating will also be a factor. Thus reducing the iron oxide content will tend to increase the strength of the film and reduce its tendency to crack upon sharp bending.

In general, the above factors are well understood in the coating art and particularly in the art of making magnetic record materials.

Figure 2:
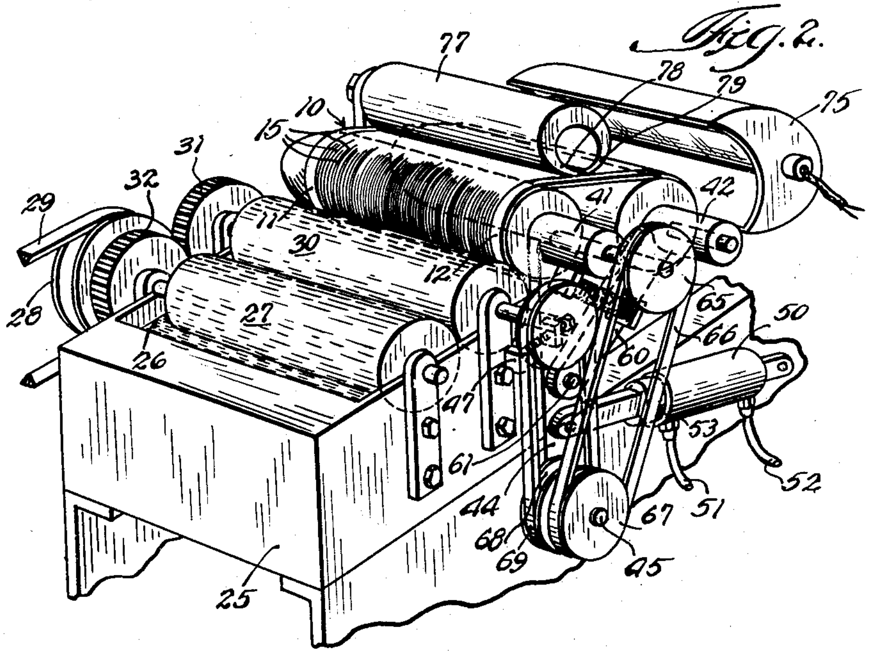
Figure 2 is an isometric view of a machine for applying a magnetic coating to the record belt illustrated in Figure 1.

Assuming that the desired suspension of iron oxide and nylon solution has been obtained, belt 10 will have a magnetizable coating applied in a suitable machine. Thus referring to Figures 2 and 3, a coating machine generally indicated by 25 has tank 26 containing the suspension previously referred to. Suitable means for preventing settling of the suspension and evaporation of solvent may be provided. Fountain roller 27, suitably supported, dips into the suspension. Fountain roller 27 is driven by pulley 28 and belt 29. Roller 27 is of rubber or other flexible material. As is well known in coating machines, there may be as many rollers as may be deemed necessary. Such rollers may be provided with means for longitudinal oscillation during rotation and may also be provided with doctor blades. For simplicity, one additional coating roller 30 is shown for receiving the coating material from fountain roller 27. Coating roller 30 has gear 31 meshing with gear 32 on the shaft for roller 27. Coating roller 30 is suitably journalled, the journals preferably having means for adjusting the amount contact between the surfaces of rollers 27 and 30.

Belt 10 is stretched between mandrels 41 and 42, these mandrels being supported at one end only with the other ends free to permit entry and removal of the belt. Mandrel 41 is supported on arm 44 pivoted at 45 on machine 25. The movement of arm 44 and mandrel 41 toward roller 30 is controlled by adjustable stop 47 carried by machine 25. Such a stop is desirable so that the separation between surfaces of roller 30 and belt 10 may be accurately controlled. In practice, belt 10 just barely touches the coating on roller 30. It is preferred to have the surface speeds of the various rollers 29, 30, and belt 10 substantially equal so that there is little or no slippage.

The position of arm 44 may be controlled in various ways. Thus air cylinder 50 having air supply pipes 51 and 62 on opposite sides of a piston may be used. Piston 53 is suitably coupled to arm 44 so that the air cylinder may maintain mandrel 41 firmly in its limiting coating position or may withdraw the mandrel from roller 30.

Mandrel 42 is carried by arm 60 pivoted at 61 on arm 44. Suitable spring means may be provided for biasing mandrel 42 away from mandrel 41 so that belt 10 is stretched over the two mandrels.

Mandrel 41 has pulley 65 driven by belt 66 from pulley 67. Pulley 67 is rigidly secured to pulley 68 driven by belt 69 from a pulley on the shaft of roller 30. The center of pulleys 67 and 68 is the center around which mandrel 41 may be moved by the air cylinder. Thus the pulley drive between mandrel 41 and roller 30 will be unaffected by adjustment of the mandrel.

This mandrel arrangement is desirable so that the belt may be driven independently of its position with respect to coating roller 30. It is desirable to drive the belt for cooperation with coating roller 30 for receiving coating material or drive the belt clear of the roller for the purpose of drying the coating. In general, a magnetizable coating whether on a belt or other record material, as tape, generally has a thickness of from about .0003" up to as much as .001" with a preferred range of between about .0004" and about .0007". When coating tape, there is no problem in connection with starting or stopping the coating. The tape at the beginning of the coating operation and at the end of the coating operation may be separated and discarded so that only tape having a continuous smooth coating need be used. This recourse is obviously not open in the case of an endless belt. In the case of an endless belt where the entire width of the belt is being coated simultaneously, it is necessary to have a satisfactory coating over the entire length of the belt. Thus it is essential to avoid any coating defects incident to starting or stopping of coating. This is accomplished by having the coating operation subdivided into a number of separate coating steps, each step providing a very thin layer of magnetizable coating and the finally desired magnetizable coating consisting of a number of such separate superimposed layers. As a rule, the number of such separate layers may range anywhere from a minimum of, say, two or three superimposed layers up to as many as five or more superimposed layers, depending upon the specifications set up for the finished coating and the smoothness thereof. For convenience in description, each of the superimposed layers of magnetizable coating will be referred to as a constituent layer and the completed coating will simply be referred to as a complete coating.

Each constituent layer of magnetizable coating is obtained by having the belt disposed in predetermined relation to the coating roller to pick up coating material therefrom. As a rule, each constituent coating layer will be obtained by having the belt make anywheres from about two to as many as five or more turns. Thus it is unnecessary to watch the belt turns to see that any integral number of turns are effected. In fact, it would be a practical impossibility to control the belt travel so that the end of a constituent layers is near to the beginning thereof. As an example, if the belt makes about five passes over the coating roller for one constituent layer and if five constituent layers are provided to make a complete coating, it follows that one pass of the belt over the coating roller will be responsible for magnetizable material having a thickness of about $\frac{1}{25}$ of the final thickness. Such a variation cannot be detected by any transducer. Satisfactory results will be obtained by providing means to insure that the belt makes, say, five turns as one example for a constituent layer, such five turns in practice ranging from some fraction below 5 to some fraction above 5.

The wet coating om magnetizable material, as a rule, has a substantially greater thickness than the same coating after it has dried, the ratio being generally of the order of about 5 to 1. It is therefore not difficult to adjust the mandrels for the belt to pick up the required thickness of wet coating material from coating roller 30.

By having the belt make a number of passes with respect to the coating roller for a constituent layer, uniformity of thickness of a constituent layer generally is provided. After the coating material has been applied to the belt to form a constituent layer, the mandrels are moved to clear roller 30 to permit the constituent layer to dry. It is desirable to dry a constituent layer before superimposing a fresh coating for a subsequent constituent layer. The drying of the preceding or underlying constituent layer of oxide should be sufficient so that the fresh coating will not redissolve the preceding coating.

In order to expedite drying, drying means such as a heat lamp 75 may be disposed, such lamp being positioned so that the belt is sensibly affected by the lamp when the belt has been moved clear of the coating roller. As illustrated here, heat lamp 75 is disposed to act upon the part of the belt over mandrel 42. Thus when the two mandrels are swung clear of coating roller 30, mandrel 42 will be brought sufficiently close to the lamp so that the heat therefrom will affect the coating and cause the same to dry. The heat from the lamp should be sufficient to provide a gentle warmth on the coating. In general, too rapid drying is not desirable since the surface texture will be affected adversely.

The thinness of the magnetic coating is of a much lower order than the dimensions of the groove in the record belt. There will be substantially no magnetic oxide in the groove and thus there will be no tendency to clog the tracking groove with oxide.

While the magnetizable coating for a constituent layer is still wet and soft, this being true while the belt is in contact with coating roller 30, it may be desirable to orient the oxide particles. The iron oxide particles generally are longer in one direction, the ratio of length to transverse dimension being usually about 4 or 5 to 1. Thus, for example, a one micron size iron oxide particle will have its one micron dimension along the length thereof with a transverse dimension of about ¼ or ⅕ of a micron.

As is well understood, these oxide particles have random orientations in the coating and on the belt. The particles are usually closely packed and together with the high surface tension forces in the binder, there may be limited freedom of such particles for turning or orientation. Nevertheless, magnetic orientation will generally act upon a sufficient number of oxide particles to provide a sensible increase in efficiency of the material for sound recording and sound reproduction. To effect magnetic orientation, magnet 77 here shown as a U-shaped permanent magnet of such material as Alnico V is provided. The magnet has pole pieces 78 and 79 disposed in close proximity to the surface of the coating, the air gap between the opposed pole pieces of the magnet extending laterally of the belt. The air gap may have any suitable dimension, as 1/16" or more. By disposing the magnet so that the pole pieces are in close proximity to the magnetizable coating, the lines of magnetic flux will be pulled downwardly into the coating and pass through the iron oxide particles. The flux density may be enough to saturate the oxide particles. Beyond that, excess flux has negligible effect.

The lines of force are generally along the length of travel of the belt so that iron oxide particles will tend to align themselves lengthwise of the belt. This tendency for alignment of iron oxide particles is principally directed to creating a force in each affected magnetic particle tending to align the particle in such a direction that the projection of the length of the particle on the belt will be lengthwise of the belt. As viewed from the edge of the belt along the belt surface in a direction perpendicular to the path of travel of the belt, namely along the line of sight across the belt, the particles, if they could be seen, may still have a random orientation ranging from a horizontal position to an extreme vertical position. It is desirable to orient the magnetic oxide particles so that their projections along lines parallel to the belt surface but along the width rather than along the length of the belt will also be horizontal. The first orientation obtained by the magnetic field may be considered as orientation along the length of the belt. This second orientation of the particles may be considered as an orientation into planes parallel to the belt surface.

In order to obtain the second type of orientation of magnetizable oxide particles, the belt may be calendered preferably with a hot polished roller. If the calendering is effected before the various constituent layers of coating are thoroughly dry and hard, some orientation by cold rolling may be effected. However, since nylon is melted readily with a hot iron or hot roller, it is preferred to calender the coating with a hot polished roller. The calendering has a tendency not only to improve the orientation of the magnetic oxide particles along lines perpendicular to the belt, but also provides a glossy smooth mirror-like surface for the nylon. The nylon coating will dry to form a matte finish which is quite smooth. However, calendering improves this surface so that it is almost mirror-smooth. This smoothness of the nylon, together with the natural lubricating properties of the nylon, results in a coating which has a surface providing for minimum wear upon transducer heads. The surface tension of the nylon when melted tends to form a thin coherent surface film on the coating and eliminates to a substantial degree the possibility of iron oxide particles actually being at the surface where such particles may be contacted by the iron of a transducer head.

Prior to calendering, the nylon coating tends to form slightly convex surfaces along the lands between adjacent grooves. This slight bulge is of the order of .0001" and may be due to the surface tension. Proper calendering effects a flattening of the nylon surfaces. The temperature, speed and pressure of calendering must be adjusted to obtain the desired surface. There are no critical values and the entire calendering process may be varied within substantial limits. Thus hotter rolls may be used with greater surface speed. Like ironing in general, it is necessary to keep the belt or the iron or both in motion at all times to prevent sticking to the iron. The pressure should be enough to flatten the slight bulge of the nylon. Excessive pressure or heat will cause the belt to buckle and damage the coating. In general, a test run is made so that a calendering roller heated to, say, 400° F. will just melt a surface layer of the coating. The calendering pressure may be gradually raised from a low value until the desired surface is obtained. No one temperature, speed or pressure is necessary and the calendering may be readily effected by an operator after some experience.

Figures 3, 4:
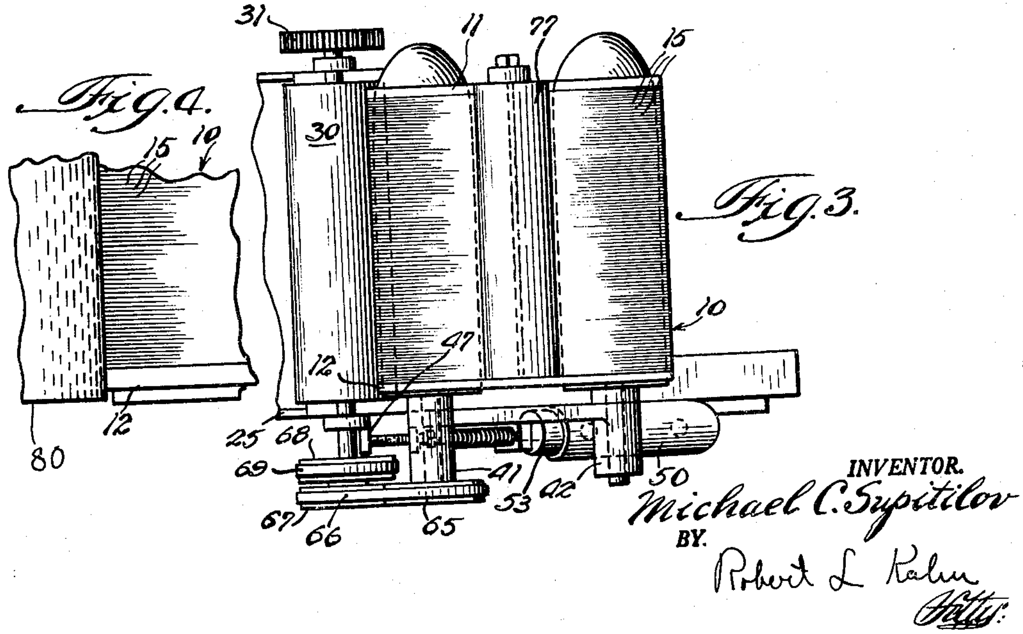
Figure 3 is a top plan view of part of the machine illustrated in Figure 2.
Figure 4 is a plan view of a simple calendering machine for finishing a magnetic coating on a record belt embodying the present invention.

In Figure 4 is shown a fragmentary view of a simple calendering means. The coated belt will be driven on two spaced mandrels as in Figures 2 and 3. A hot polished roller 80 is rotated at the same surface speed as the belt. The pressure of the roller may be controlled by an air cylinder as in Figure 2.

It is understood that the coating technique utilizing the new coating composition including a nylon solution may be used on record material other than nylon and having a form other than a belt. Thus the new coating composition with the dissolved nylon may be used on tape, discs or cylinders of nylon or other material. In the case of tape, the magnetizable coating may be disposed in one application, the coated tape passing under the influence of a magnet, either permanent or electromagnet, and then passing on to suitable drying means such as heat lamps, if such drying means are necessary or desirable.

A record of flexible nylon having a magnetizable coating including dissolved nylon as a binder has been found to have unusually desirable characteristics and an unusually long useful life. The nylon having the hardness and stiffness characteristics previously referred to is particularly desirable. Other nylons may be used under conditions where the requirements are less rigorous or where durability is not important. The toughness of nylon, together with its ability to resist creasing and yet maintain its "life," results in a belt which can stand hard usage and abuse for long periods of time under a wide variety of conditions. The new belt also has a desirably long shelf life with substantially no tendency to tear at the edges. The nylon coating apart from the belt material has resulted in greatly improved transducer performance and has made it possible to operate transducers for long periods of time without showing appreciable wear on the metal.

What is claimed is:

1. A magnetizable record having a flat surface of substantial area available for cooperation with a transducer head, the area of contact between the record and head being flat and having a length along the direction of relative record movement substantially greater than the transverse width of said area, said record comprising a nylon base having a thickness of about .012 inch with the length and width being much greater, said nylon having a hardness of about R45 Rockwell and a stiffness of about 20,000 lbs. per square inch, said nylon having substantial resistance to stretching and tearing and having such good memory as to provide good recovery from creasing and being elastomeric and "springy," said nylon base having a thin magnetizable coating of iron oxide in precipitated nylon as a binder, said nylon binder providing great strength for maintaining the oxide particles together and the binder and base being compatible so that excellent adhesion between the base and oxide film is provided, said record being usable in the form of a plastic belt or disc and the nylon properties of both the base and binder permitting the entire record to withstand rough usage without damage and the "springy" property providing for vibration dissipation in the record and permitting the record at the region of contact with the transducer head to rest upon a hard supporting surface without undesirable vibration characteristics, said nylon having good shelf life without change in characteristics.

2. The record according to claim 1 wherein said record base has a fine tracking groove formed therein, said nylon having sufficiently good memory during the formation of said groove so that the fine groove will remain for the life of the record.

References Cited in the file of this patent

UNITED STATES PATENTS 2,525,601 Howell ---------------- Oct. 10, 1950

2,536,029 Camras ---------------- Jan. 2, 1951
2,566,441 Camras ---------------- Sept. 4, 1951
2,581,765 Mann ---------------- Jan. 8, 1952
2,674,547 Paxton et al. ---------------- Apr. 6, 1954
2,686,137 Rossin et al. ---------------- Aug. 10, 1954
2,712,987 Storrs et al. ---------------- July 12, 1955
2,721,906 Sharpe ---------------- Oct. 25, 1955
2,796,359 Speed ---------------- June 18, 1957

FOREIGN PATENTS 966,682 France ---------------- Oct. 16, 1950
1,053,854 France ---------------- Oct. 7, 1953